(12) United States Patent
Zhang et al.

(10) Patent No.: US 12,470,094 B2
(45) Date of Patent: Nov. 11, 2025

(54) STATOR LAMINATION AND ELECTRIC MOTOR COMPRISING THE SAME

(71) Applicant: Zhongshan Broad-Ocean Motor Co., Ltd., Zhongshan (CN)

(72) Inventors: Shaner Zhang, Zhongshan (CN); Sanzeng Liang, Zhongshan (CN); Huijun Zhan, Zhongshan (CN); Hongyu Jia, Zhongshan (CN); Min Dong, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 286 days.

(21) Appl. No.: 18/231,755

(22) Filed: Aug. 8, 2023

(65) Prior Publication Data

US 2023/0387733 A1 Nov. 30, 2023

Related U.S. Application Data

(63) Continuation-in-part of application No. PCT/CN2021/115560, filed on Aug. 31, 2021.

(30) Foreign Application Priority Data

Feb. 9, 2021 (CN) .......................... 202120361107.4

(51) Int. Cl.
*H02K 1/16* (2006.01)
(52) U.S. Cl.
CPC .................................. *H02K 1/165* (2013.01)
(58) Field of Classification Search
CPC .................................. H02K 1/16; H02K 1/165
(Continued)

(56) References Cited

U.S. PATENT DOCUMENTS 10,734,853 B2 * 8/2020 Taniguchi ............ H02K 1/2746
2007/0273241 A1 11/2007 Niguchi et al.
(Continued)

FOREIGN PATENT DOCUMENTS

| CN | 203352305 U | 12/2013 |
| CN | 204258458 U | 4/2015 |
| CN | 210780257 U | 6/2020 |

OTHER PUBLICATIONS

Shuxia Yang et al., Research on a Generator Stator Punching Plate, Movable Power Station&Vehicle, Dec. 20, 2020, pp. 30-33, vol. 4, Lanzhou Power Station&Vehicle.Institue. Co., Ltd., Lanzhou, China.

*Primary Examiner* — Rashad H Johnson
(74) *Attorney, Agent, or Firm* — MATTHIAS SCHOLL P.C.; Matthias Scholl

(57) ABSTRACT

A stator lamination includes a middle part, an annular yoke, and a plurality of stator teeth. The middle part includes a central hole. The plurality of stator teeth extend from the inner side of the annular yoke and are evenly distributed. A wire slot is formed between every two adjacent stator teeth, whereby the annular yoke includes a plurality of wire slots. Each of the plurality of stator teeth includes a tooth root and a pole shoe disposed at one end of the tooth root. The stator lamination has an outer diameter ranging from 61.75 mm to 68.25 mm, and the central hole has a diameter ranging from 31.6 mm to 35 mm. The plurality of wire slots are evenly distributed around an edge of a circle, and the bottom part of each wire slot is tangent to the circle.

12 Claims, 5 Drawing Sheets

(58) Field of Classification Search
USPC .................................................. 310/216.112
See application file for complete search history.

(56) References Cited

U.S. PATENT DOCUMENTS

| | | |
|---|---|---|
| 2017/0250594 A1* | 8/2017 | Asano ..................... H02K 21/38 |
| 2021/0210998 A1* | 7/2021 | Yabe ........................ H02K 7/14 |
| 2021/0273506 A1* | 9/2021 | Masuko ................... H02K 1/148 |
| 2023/0052600 A1* | 2/2023 | Thiele ...................... H02K 1/28 |
| 2023/0115303 A1* | 4/2023 | Yazaki ..................... H02K 1/30 |
| | | 29/598 |
| 2023/0124308 A1* | 4/2023 | Pan ...................... H02K 1/2783 |
| | | 310/156.55 |
| 2024/0030756 A1* | 1/2024 | Shimokawa ........... H02K 1/146 |
| 2024/0223028 A1* | 7/2024 | Liu ........................ H02K 1/165 |
| 2024/0297559 A1* | 9/2024 | Bevilaqua ............ H02K 1/2795 |
| 2024/0364149 A1* | 10/2024 | Hill ......................... H02K 3/18 |
| 2024/0364150 A1* | 10/2024 | Pulnikov .............. H02K 1/2766 |

* cited by examiner

STATOR LAMINATION AND ELECTRIC MOTOR COMPRISING THE SAME

CROSS-REFERENCE TO RELATED APPLICATIONS

This application is a continuation-in-part of International Patent Application No. PCT/CN2021/115560 with an international filing date of Aug. 31, 2021, designating the United States, and further claims foreign priority benefits to Chinese Patent Application No. 202120361107.4 filed Feb. 9, 2021. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a stator lamination and an electric motor comprising the same.

Conventional stator laminations include a middle part provided with a through hole. The stator laminations further include an annular yoke and a plurality of stator teeth that extend inward from the annular yoke and are evenly distributed. A plurality of wire slot are formed between every two adjacent stator teeth. Each stator tooth includes an upright tooth root and a pole shoe located at one end of the upright tooth root. However, the thickness of the pole shoe is insufficient, and upon magnetic circuit calculations and analysis, the conventional stator lamination has the following drawbacks:

(1) A significant discrepancy exists in the magnetic flux density distribution between the annular yoke and the stator teeth, resulting in reduced magnetic utilization and decreased motor efficiency.

(2) The utilization rate of the stator lamination is suboptimal, leading to increased costs. Furthermore, there is issues of excessive local magnetic flux density, elevated temperature, significant motor noise, and reduced motor efficiency.

Currently, the rotor core of the motor is formed by stacking multiple rotor laminations, and a plurality of rotor slots are uniformly distributed along the edge of each rotor lamination. Conductive elements are installed inside the rotor slots. However, the coordination between the wire slots of the stator lamination and the conductive elements of the rotor lamination is not rational, leading to the following issues:

(1) The coordination between the wire slots of the stator core and the rotor slots of the rotor core is unreasonable, leading to low motor efficiency and reduced motor lifespan.

(2) The uneven distribution of magnetic flux density occurs in both the stator lamination and the rotor lamination during different cycles, affecting the motor's efficiency and resulting in increased electromagnetic noise, ultimately reducing the motor's lifespan.

SUMMARY

The disclosure provides a stator lamination and an electric motor comprising the same. The stator lamination offers several advantages, including a simple structure, excellent processability, a balanced magnetic circuit, suitable magnetic flux density, improved motor efficiency, reduced motor noise, and an extended motor lifespan.

The first objective of the disclosure is to provide a stator lamination. The stator lamination comprises a middle part, an annular yoke, and a plurality of stator teeth. The middle part comprises a central hole. The plurality of stator teeth extend from the inner side of the annular yoke and are evenly distributed on the annular yoke. A wire slot is formed between every two adjacent stator teeth, whereby the annular yoke comprises a plurality of wire slots. Each of the plurality of stator teeth comprises a tooth root and a pole shoe disposed at one end of the tooth root. The stator lamination has an outer diameter $D1$ ranging from 61.75 mm to 68.25 mm, and the central hole has a diameter $D2$ ranging from 31.6 mm to 35 mm. The plurality of wire slots are evenly distributed around an edge of a circle, and the bottom part of each wire slot is tangent to the circle, and the circle has a diameter $D3$ ranging from 54.72 mm to 60.48 mm. The tooth root has a tooth width $L1$ ranging from 4.75 mm to 5.25 mm, and the pole shoe has a thickness $H1$ ranging from $0.3 L1$ to $0.45 L1$. The stator lamination comprises eight stator teeth and eight wire slots.

In a class of this embodiment, the tooth width $L1$ of the tooth root is 5 mm, and the thickness $H1$ of the pole shoe is in the range of 1.5 mm to 2.25 mm.

In a class of this embodiment, the annular yoke has a minimum thickness $H2$ ranging from 3.5 mm to 3.9 mm.

In a class of this embodiment, the outer diameter $D1$ of the stator lamination is 65 mm, the central hole has a diameter $D2$ of 33.3 mm, the diameter $D3$ of the circle is 57.6 mm, the thickness $H1$ of the pole shoe is 2.15 mm, and the minimum thickness $H2$ of the annular yoke is 3.7 mm.

In a class of this embodiment, each of the plurality of wire slots comprises an arc segment and two straight segments respectively tangent to both ends of the arc segment. Each tooth root comprises a tooth edge perpendicular to the two straight segments.

The second objective of the disclosure is to provide an electric motor comprising the stator lamination. The electric motor comprises a rotor assembly, a stator assembly, and a casing assembly. The stator assembly is disposed inside the casing assembly. The rotor assembly is disposed within the stator assembly. The stator assembly comprises a stator core, an end insulator, and a plurality of coil windings, and the stator core comprises a plurality of stator laminations stacked together. The rotor assembly comprises a rotating shaft and a rotor core comprising a plurality of rotor laminations stacked together. Each of the plurality of rotor laminations comprises a shaft hole and a plurality of rotor slots. The rotating shaft is disposed through the shaft hole, and the plurality of rotor slots are uniformly distributed around the edge of each of the plurality of rotor laminations. The electric motor further comprises a plurality of conductive elements respectively disposed inside the rotor slots; a rotor tooth is formed between every two adjacent rotor slots. Each of the plurality of stator laminations comprises eight wire slots. A ratio of the number of wire slots in each stator lamination to the number of rotor slots in each rotor lamination is in the range of 8:13 to 8:24.

In a class of this embodiment, the ratio of the number of wire slots in each stator lamination to the number of rotor slots in each rotor lamination is 8:15.

In a class of this embodiment, each of the plurality of rotor laminations has a diameter $D4$ ranging from 31.6 mm to 35 mm; the shaft hole has a diameter D5 ranging from 7.6 mm to 8.4 mm; and the rotor tooth has a width L2 ranging from 2.328 mm to 2.573 mm.

In a class of this embodiment, the diameter D4 of each of the plurality of rotor laminations is 33.3 mm; the diameter D5 of the shaft hole is 8 mm; and the width L2 of the rotor tooth is 2.45 mm.

The following advantages are associated with a stator lamination and an electric motor comprising the same of the disclosure.

1. The stator lamination comprises a middle part, an annular yoke and a plurality of stator teeth. The middle part comprises a central hole. The plurality of stator teeth extend from the inner side of the annular yoke and are evenly distributed. A wire slots is formed between every two adjacent stator teeth. Each of the plurality of stator teeth comprises a tooth root and a pole shoe disposed at one end of the tooth root. The stator lamination has an outer diameter D1 ranging from 61.75 mm to 68.25 mm, and the central hole comprises an inner diameter D2 ranging from 31.6 mm to 35 mm. The plurality of wire slots are evenly distributed around an edge of a circle, and the bottom part of each wire slot is tangent to the circle, and the circle has a diameter D3 ranging from 54.72 mm to 60.48 mm. The tooth root has a width L1 ranging from 4.75 mm to 5.25 mm, and the pole shoe has a thickness H1 ranging from 0.3 L1 to 0.45 L1. The stator lamination comprises eight stator teeth and eight wire slots, providing a simple structure and excellent processability. Through the optimization of the size and structure of a stator core and the increase in the thickness of the pole shoe, a more uniform distribution of magnetic flux density is achieved across the stator core, thereby reducing localized magnetic saturation effects. As a result of the improvement, the motor efficiency is enhanced, and the motor's lifespan is extended.

2. The electric motor comprises a rotor assembly and a stator assembly. The rotor assembly is disposed within the stator assembly. The stator assembly comprises a stator core, an end insulator, and a plurality of coil windings. A plurality of stator laminations are stacked together to form the stator core. The rotor assembly comprises a rotor core. A plurality of rotor laminations are stacked together to form the rotor core. A plurality of rotor slots are uniformly distributed around the edges of each of the plurality of rotor laminations. The electric motor further comprises a plurality of conductive elements respectively disposed inside the rotor slots. Each of the plurality of stator laminations comprises eight wire slots. A ratio of the number of wire slots in each stator laminations to the number of rotor slots in each rotor laminations is in the range of 8:13 to 8:24. The design optimizes the coordination between the wire slots in the stator laminations and the rotor slots in the rotor laminations, resulting in improved motor efficiency, reduced motor noise, and extended motor lifespan. By utilizing the eight wire slots, the manufacturing process is streamlined, and the number of wire crossovers in the winding machine is reduced by half. The optimization increases production efficiency, and ultimately lowers the motor's cost.

DETAILED DESCRIPTION

To further illustrate the disclosure, embodiments detailing a stator lamination and an electric motor comprising the same are described below. It should be noted that the following embodiments are intended to describe and not to limit the disclosure.

Example 1

Figure 1:
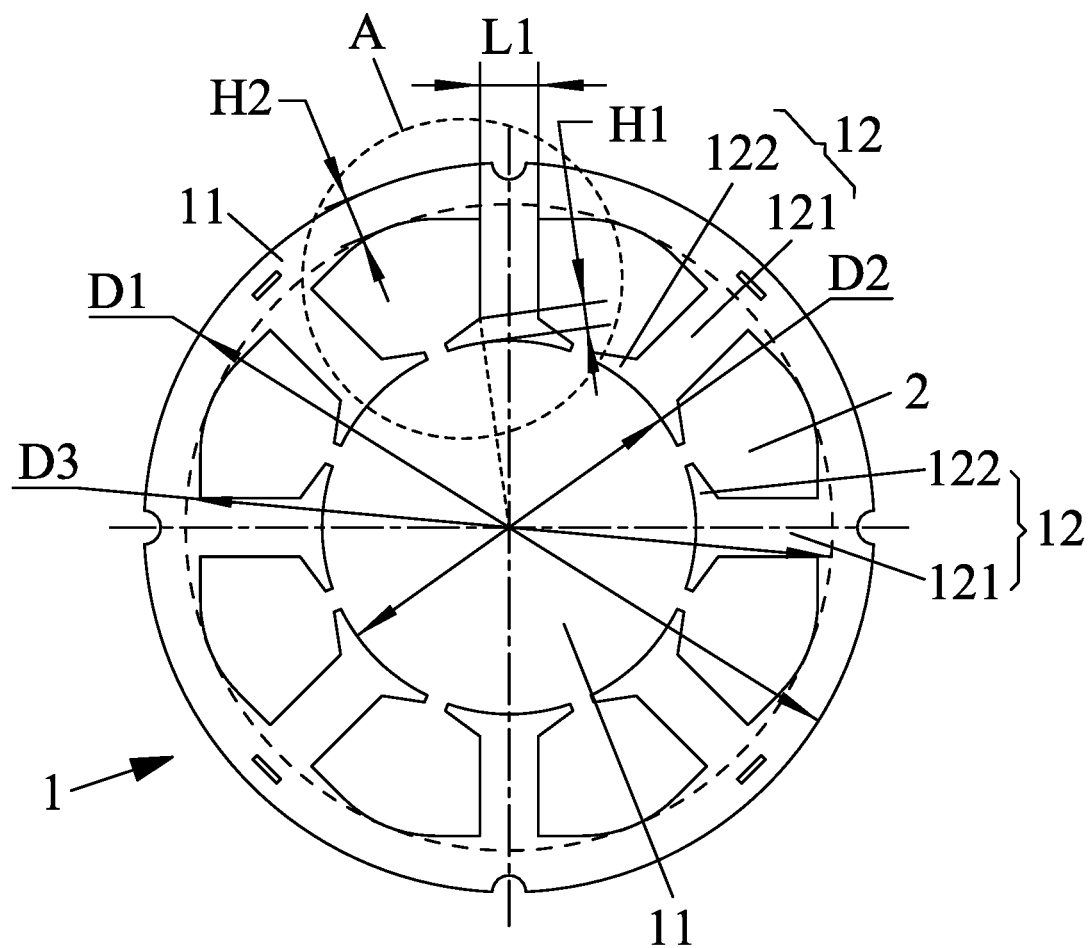
FIG. 1 is a cross sectional view of a stator lamination according to Example 1 of the disclosure.
Figure 2:
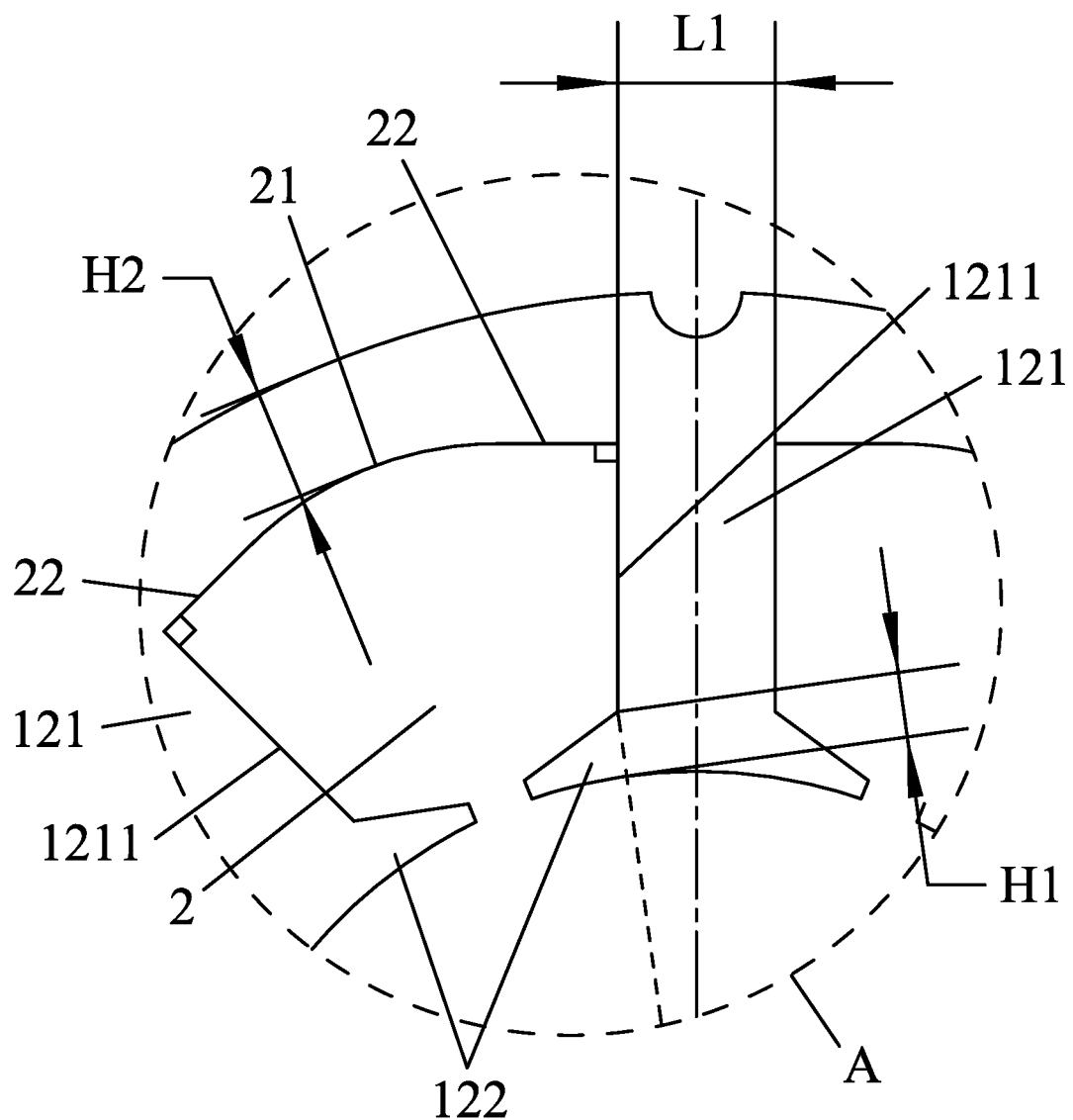
FIG. 2 is a local enlarge view of part A of FIG. 1.

As shown in FIGS. 1 and 2, a stator lamination 1 comprises a middle part, an annular yoke 11 and a plurality of stator teeth 12. The middle part comprises a central hole. The plurality of stator teeth 12 extend from the inner side of the annular yoke 11 and are evenly distributed. A wire slots 2 is formed between every two adjacent stator teeth 12. Each of the plurality of stator teeth 12 comprises a tooth root 121 and a pole shoe 122 disposed at one end of the tooth root 121. The stator lamination 1 has an outer diameter D1 ranging from 61.75 mm to 68.25 mm, and the central hole comprises an inner diameter D2 ranging from 31.6 mm to 35 mm. The plurality of wire slots are evenly distributed around an edge of a circle, and a bottom part of each wire slot is tangent to the circle, and the circle has a diameter D3 ranging from 54.72 mm to 60.48 mm. The tooth root 121 has a width L1 ranging from 4.75 mm to 5.25 mm, and the pole shoe 122 has a thickness H1 ranging from 0.3 L1 to 0.45 L1. The stator lamination 1 comprises eight stator teeth 12 and eight wire slots 2, providing a simple structure and excellent processability. Through the optimization of the size and structure of a stator core 51 and the increase in the thickness of the pole shoe 122, a more uniform distribution of magnetic flux density is achieved across the stator core 51, thereby reducing localized magnetic saturation effects. As a result of the improvement, the motor efficiency is enhanced, and the motor's lifespan is extended.

Preferably, the width L1 of tooth root is 5 mm, and the thickness H1 of the pole shoe 122 is in the range of 1.5 mm to 2.25 mm.

Preferably, the annular yoke 11 has a minimum thickness H2 ranging from 3.5 mm to 3.9 mm.

Specifically, the outer diameter D1 of the stator lamination 1 is 65 mm, the central hole has a diameter D2 of 33.3 mm, the diameter D3 of the circle is 57.6 mm, the thickness H1 of the pole shoe 122 is 2.15 mm, and the minimum thickness H2 of the annular yoke 11 is 3.7 mm.

Each of the plurality of wire slots 2 comprises an arc segment 21 and two straight segments 22 tangent to both ends of the arc segment 21. Each tooth root 121 comprises a tooth edge 1211 perpendicular to the two straight segments 22, making the winding process easier and more efficient.

Example 2

Figure 3:
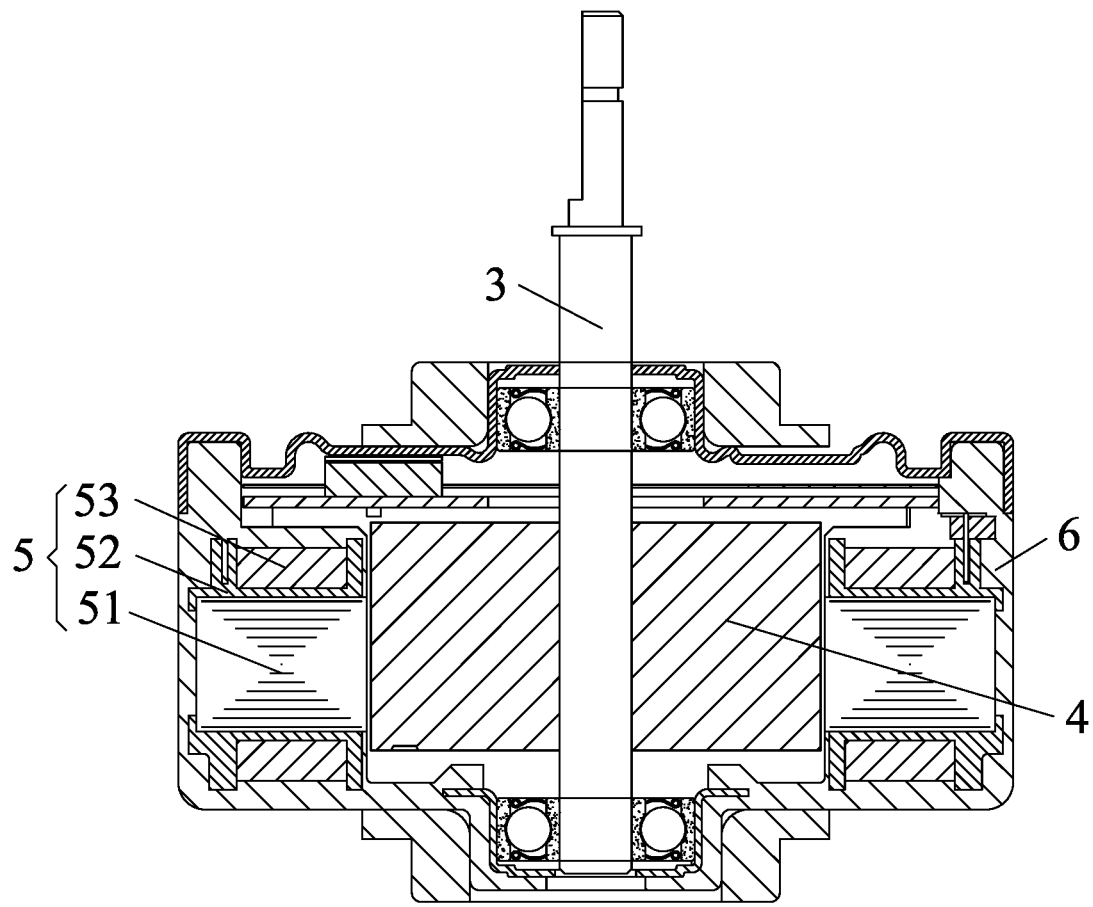
FIG. 3 is a cross sectional view of an electric motor according to Example 2 of the disclosure.
Figure 4:
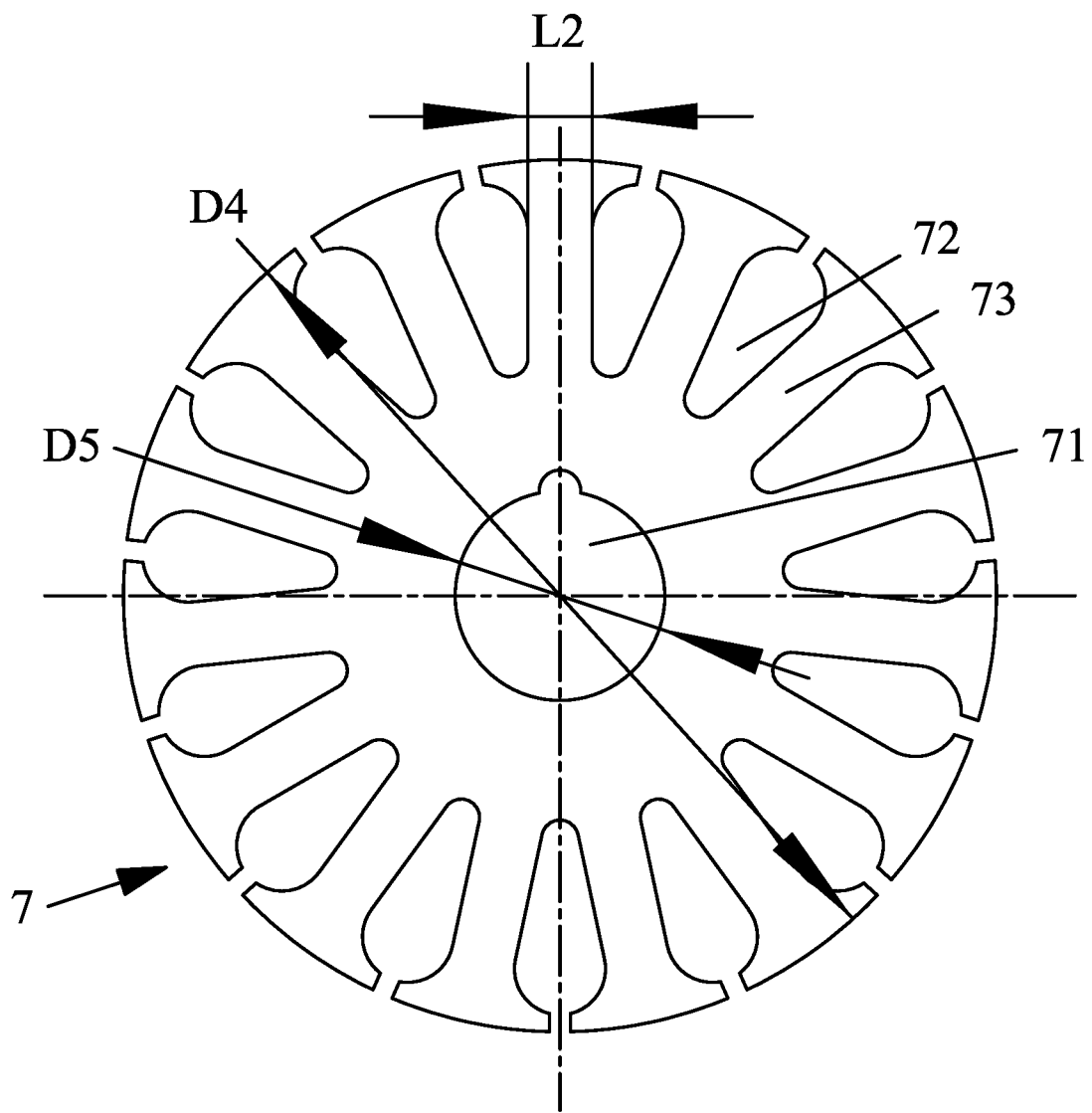
FIG. 4 is a cross sectional view of a rotor lamination according to Example 2 of the disclosure.
Figure 5:
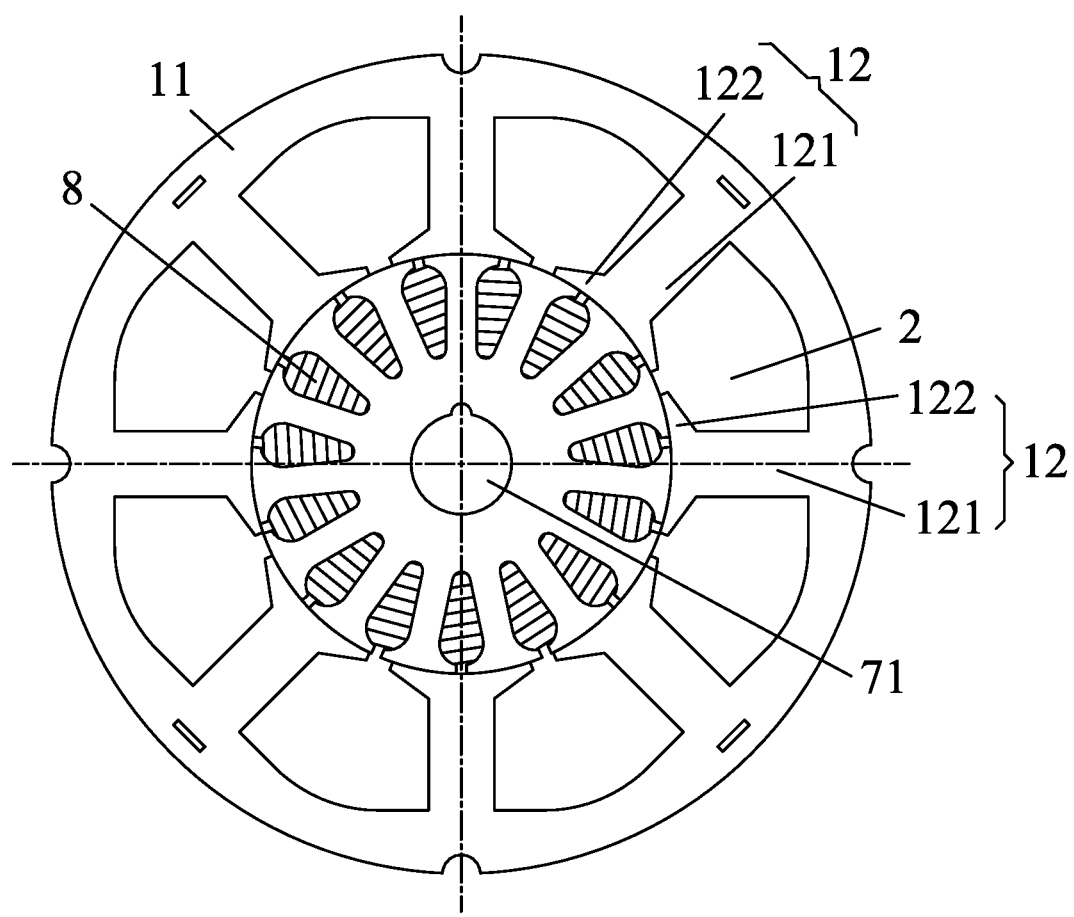
FIG. 5 is a cross sectional view of arrangement of a stator lamination and a rotor lamination according to Example 2 of the disclosure.

As shown in FIGS. 3-5, an electric motor comprises a rotor assembly 4, a stator assembly 5, and a casing assembly 6. The rotor assembly 4 comprises a rotating shaft 3. The stator assembly 5 is disposed inside the casing assembly 6. The rotor assembly 4 is disposed within the stator assembly 5. The stator assembly 5 comprises a stator core 51, an end insulator 52, and a plurality of coil windings 53. A plurality of stator laminations 1 are stacked together to form the stator core 51. The rotor assembly 4 comprises a rotor core. A plurality of rotor laminations 7 are stacked together to form the rotor core. Each of the plurality of rotor laminations 7 comprises a shaft hole 71 and a plurality of rotor slots 72. The rotating shaft 3 is disposed through the shaft hole 71, and the plurality of rotor slots 72 is uniformly distributed around the edge of each of the plurality of rotor laminations 7. The electric motor further comprises a plurality of conductive elements 8 respectively disposed inside the rotor slots 72. A rotor tooth 73 is formed between every two adjacent rotor slots 72.

The plurality of stator laminations 1, as described in Example 1, are used in the stator assembly. Each of the plurality of stator laminations 1 comprises eight wire slots 2. A ratio of the number of wire slots 2 in each stator laminations 1 to the number of rotor slots 72 in each rotor laminations 7 is in the range of 8:13 to 8:24. The design optimizes the coordination between the wire slots 2 in the stator laminations 1 and the rotor slots 72 in the rotor laminations 7, resulting in improved motor efficiency, reduced motor noise, and extended motor lifespan. By utilizing the eight wire slots 2, the manufacturing process is streamlined, and the number of wire crossovers in the winding machine is reduced by half. The optimization increases production efficiency, and ultimately lowers the motor's cost.

Preferably, the ratio of the number of wire slots 2 in each stator lamination 1 to the number of rotor slots 72 in each rotor lamination 7 is 8:15. The design optimizes the coordination between the wire slots 2 in the stator core 51 and the rotor slots 72 in the rotor core, ensuring a uniform distribution of magnetic flux density in both the stator laminations 1 and the rotor laminations 7 during different cycles. The optimization leads to reduced localized magnetic saturation effects, minimized motor noise, ultimately enhancing motor efficiency, and extending the motor's lifespan.

Each of the plurality of rotor laminations 7 has a diameter D4 ranging from 31.6 mm to 35 mm. The shaft hole 71 has a diameter D5 ranging from 7.6 mm to 8.4 mm. The rotor tooth 73 has a width L2 ranging from 2.328 mm to 2.573 mm. The optimization enhances the size and structure of the rotor laminations 7, leading to a more uniform distribution of magnetic flux density in all parts of the rotor laminations 7. The reduction in localized magnetic saturation effects improves motor efficiency and extends the motor's lifespan.

Specifically, the diameter D4 of each of the plurality of rotor laminations 7 is 33.3 mm, the diameter D5 of the shaft hole 71 is 8 mm, and the width L2 of the rotor tooth 73 is 2.45 mm.

It will be obvious to those skilled in the art that changes and modifications may be made, and therefore, the aim in the appended claims is to cover all such changes and modifications.

What is claimed is:

1. A stator lamination, comprising:
    a middle part;
    an annular yoke; and
    a plurality of stator teeth;
wherein:
    the middle part comprises a central hole;
    the plurality of stator teeth extend from an inner side of the annular yoke and are evenly distributed on the annular yoke;
    a wire slot is formed between every two adjacent stator teeth, whereby a plurality of wire slots are formed on the annular yoke;
    each of the plurality of stator teeth comprises a tooth root and a pole shoe disposed at one end of the tooth root;
    the stator lamination has an outer diameter D1 ranging from 61.75 mm to 68.25 mm, and the central hole has a diameter D2 ranging from 31.6 mm to 35 mm;
    the plurality of wire slots are evenly distributed around an edge of a circle, and a bottom part of each wire slot is tangent to the circle, and the circle has a diameter D3 ranging from 54.72 mm to 60.48 mm;
    the tooth root has a tooth width L1 ranging from 4.75 mm to 5.25 mm, and the pole shoe has a thickness H1 ranging from 0.3 L1 to 0.45 L1; and
    the stator lamination comprises eight stator teeth and eight wire slots.

2. The stator lamination of claim 1, wherein the tooth width L1 of the tooth root is 5 mm, and the thickness H1 of the pole shoe is in the range of 1.5 mm to 2.25 mm.

3. The stator lamination of claim 2, wherein the annular yoke has a minimum thickness H2 ranging from 3.5 mm to 3.9 mm.

4. The stator lamination of claim 3, wherein the outer diameter D1 of the stator lamination is 65 mm, the central hole has a diameter D2 of 33.3 mm, the diameter D3 of the circle is 57.6 mm, the thickness H1 of the pole shoe is 2.15 mm, and the minimum thickness H2 of the annular yoke is 3.7 mm.

5. The stator lamination of claim 4, wherein each of the plurality of wire slots comprises an arc segment and two straight segments respectively tangent to both ends of the arc segment, and each tooth root comprises a tooth edge perpendicular to the two straight segments.

6. The stator lamination of claim 1, wherein the annular yoke has a minimum thickness H2 ranging from 3.5 mm to 3.9 mm.

7. The stator lamination of claim 6, wherein the outer diameter D1 of the stator lamination is 65 mm, the central hole has a diameter D2 of 33.3 mm, the diameter D3 of the circle is 57.6 mm, the thickness H1 of the pole shoe is 2.15 mm, and the minimum thickness H2 of the annular yoke is 3.7 mm.

8. The stator lamination of claim 7, wherein each of the plurality of wire slots comprises an arc segment and two straight segments respectively tangent to both ends of the arc segment, and each tooth root comprises a tooth edge perpendicular to the two straight segments.

9. An electric motor, comprising:
    a rotor assembly;
    a stator assembly; and
    a casing assembly;
wherein
    the stator assembly is disposed inside the casing assembly; the rotor assembly is disposed within the stator assembly;
    the stator assembly comprises a stator core, an end insulator, and a plurality of coil windings, and the stator core comprises a plurality of stator laminations stacked together;
    the rotor assembly comprises a rotating shaft and a rotor core comprising a plurality of rotor laminations stacked together;
    each of the plurality of rotor laminations comprises a shaft hole and a plurality of rotor slots; the rotating shaft is disposed through shaft holes, and the plurality of rotor slots are uniformly distributed around an edge of each of the plurality of rotor laminations; the electric motor further comprises a plurality of conductive elements respectively disposed inside the rotor slots; a rotor tooth is formed between every two adjacent rotor slots; and each of the plurality of stator laminations comprises eight wire slots; and a ratio of a number of wire slots in each stator lamination to a number of rotor slots in each rotor lamination is in the range of 8:13 to 8:24.

10. The electric motor of claim 9, wherein the ratio of the number of wire slots in each stator lamination to the number of rotor slots in each rotor lamination is 8:15.

11. The electric motor of claim 10, wherein each of the plurality of rotor laminations has a diameter D4 ranging from 31.6 mm to 35 mm; the shaft hole has a diameter D5 ranging from 7.6 mm to 8.4 mm; and the rotor tooth has a width L2 ranging from 2.328 mm to 2.573 mm.

12. The electric motor of claim 11, wherein the diameter D4 of each of the plurality of rotor laminations is 33.3 mm; the diameter D5 of the shaft hole is 8 mm; and the width L2 of the rotor tooth is 2.45 mm.

* * * * *